(12) United States Patent
Roth et al.

(10) Patent No.: US 10,002,205 B2
(45) Date of Patent: Jun. 19, 2018

(54) EFFICIENT METHOD FOR INDEXING DATA TRANSFERRED BETWEEN MACHINES IN DISTRIBUTED GRAPH PROCESSING SYSTEMS

(71) Applicant: Oracle International Corporation, Redwood Shores, CA (US)

(72) Inventors: Nicholas Roth, San Jose, CA (US); Sungpack Hong, Palo Alto, CA (US); Siegfried Depner, Bavaria (DE); Thomas Manhardt, San Carlos, CA (US); Hassan Chafi, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 372 days.

(21) Appl. No.: 14/947,382

(22) Filed: Nov. 20, 2015

(65) Prior Publication Data

US 2017/0147706 A1    May 25, 2017

(51) Int. Cl.
*G06F 17/30* (2006.01)

(52) U.S. Cl.
CPC .............. *G06F 17/30958* (2013.01)

(58) Field of Classification Search
USPC ........................................ 707/741, 798, 803
See application file for complete search history.

(56) References Cited

U.S. PATENT DOCUMENTS

| 8,321,492 | B1 | 11/2012 | Sengupta et al. |
| 9,477,532 | B1* | 10/2016 | Hong .............. G06F 9/4881 |
| 2009/0097418 | A1* | 4/2009 | Castillo ............ H04L 41/12 370/255 |
| 2012/0158858 | A1 | 6/2012 | Gkantsidis |

(Continued)

FOREIGN PATENT DOCUMENTS

WO    WO2015099562 A1    7/2015

OTHER PUBLICATIONS

Roth et al., "PGX.D/Async: A Scalable Distributed Graph Pattern Matching Engine", ACM, dated May 19, 2017, 6 pages.

(Continued)

*Primary Examiner* — Cam-Linh Nguyen
(74) *Attorney, Agent, or Firm* — Hickman Palermo Becker Bingham LLP (57) ABSTRACT

Techniques herein index data transferred during distributed graph processing. In an embodiment, a system of computers divides a directed graph into partitions. The system creates one partition per computer and distributes each partition to a computer. Each computer builds four edge lists that enumerate edges that connect the partition of the computer with a partition of a neighbor computer. Each of the four edge lists has edges of a direction, which may be inbound or outbound from the partition. Edge lists are sorted by identifier of the vertex that terminates or originates each edge. Each iteration of distributed graph analysis involves each computer processing its partition and exchanging edge data or vertex data with neighbor computers. Each computer uses an edge list to build a compactly described range of edges (Continued)

that connect to another partition. The computers exchange described ranges with their neighbors during each iteration.

20 Claims, 6 Drawing Sheets

(56) References Cited

U.S. PATENT DOCUMENTS

2012/0303685 A1 11/2012 Ulrich
2017/0127466 A1* 5/2017 Narasimha ............ H04W 16/18

OTHER PUBLICATIONS

Presta et al., "Large-scale Graph Partitioning with Apache Giraph", Engineering Blog, Facebook Code, dated Apr. 9, 2014, 8 pages.
Nelson et al., "Latency-Tolerant Software Distributed Shared Memory", dated Jul. 10, 2015, 15 pages.
Karypis, George,METIS, A Software Package for Partitioning Unstructured Graphs, Partitioning Meshes, and Computing Fill-Reducing Orderings of Sparse Matrices Version 5.1.0, dated Mar. 30, 2013, 35pgs.
Gonzalez et al., "GraphX Processing in a Distributed Dataflow Framework", https://amplab.cs.berkeley.edu/wp-content/uploads/2014/09/graphx.pdf, dated 2014, 15 pages.
Tian et al., From "Think Like a Vertex" to "Think Like a Graph", 40th International Conference on Very Large Data Bases, dated Sep. 2014, Proceedings of the VLDB Endowment, vol. 7, No. 3, 12 pgs.
Then et al., "Evaluation of Parallel Graph Loading Techniques", ACM, Grades 2016 , Jun. 24, 2016, Redwood Shores, 6 pages.
Low et al., "Distributed GraphLab: A Framework for Machine Learning and Data Mining in the Cloud", Proceedings of the VLDB Endowment, vol. 5, No. 8, dated 2012, 12 pages.
Gonzalez, "GraphX: Graph Processing in a Distributed Dataflow Framework", Proceedings of the 11th USENIX Symposium on Operating Systems Design and Implementation, dated Oct. 2014, 16 pages.
Gonzalez et al., "PowerGraph: Distributed Graph-Parallel Computation on Natural Graphs", 10th USENIX Symposium on Operating Systems Design and Implementation, dated 2012, 14 pages.

* cited by examiner

PARTICIPANT COMPUTER 540

MESSAGE 580

| EDGE INDEX | EDGE COUNT | | |
|---|---|---|---|
| 0 | 4 | | |
| INCLUSION BITMAP 561 | | | |
| Bit 500 | Bit 501 | Bit 502 | Bit 503 |
| 1 | 0 | 0 | 1 |
| VALUE | | | |
| 0.12 | | | |
| 0.23 | | | |

EDGE LIST 551

| EDGE OFFSET | EDGE ID | SOURCE VERTEX ID | TARGET VERTEX ID |
|---|---|---|---|
| 0 | 534 | 523 | 521 |
| 1 | 532 | 524 | 521 |
| 2 | 536 | 523 | 522 |
| 3 | 537 | 524 | 522 |

FIG. 6

EFFICIENT METHOD FOR INDEXING DATA TRANSFERRED BETWEEN MACHINES IN DISTRIBUTED GRAPH PROCESSING SYSTEMS

FIELD OF THE DISCLOSURE

This disclosure relates to distributed graph analysis by a system of computers. Techniques of transmitting data and metadata of edges and vertices between computers of the system are presented.

BACKGROUND

Graph analysis has been popularized as an effective method for in-depth data analysis. By modeling an underlying dataset as a graph, the model is able to capture fine-grained arbitrary relationships between data entities. By analyzing these relationships, graph analysis can provide valuable insights about the original dataset.

Due to the recent trend of increasingly large datasets of "big data", graph analysis deals with very large graphs that do not fit within the memory of a single computer. In response to this issue, various distributed graph processing systems were created. These systems work in cluster environments in which a large graph is distributed across machines in the cluster. The computations involved in graph analysis are performed in parallel on each computer. Computers communicate over a communications network when they need access to parts of the graph held by a different computer.

Many popular graph algorithms can be expressed as multiple iterations of a computation kernel. A straightforward implementation of an analysis kernel in a distributed environment can be challenging because the above pattern requires transferring data between computers. However, some popular graph processing systems do not support these data transfers.

In a typical implementation of this data transfer, a computer sends data to a different computer when such data is requested or when the computer performs a computation that must modify data held by the different computer. Such an approach has limitations. The same data may be repeatedly transferred unnecessarily. Data is only sent after it is required for a computation or modified in the course of performing a computation on a graph. The data must be sent with information about which part of the graph it corresponds to and possibly what operation it corresponds to.

One solution to this problem that avoids the aforementioned limitations is to send data only once, in bulk, and then use that data to finish the computation. However, this presents a problem of efficiently accessing the data.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example System of Computers
   2.1 Graph Partitions
   2.2 Distributed Analytics
   2.3 Many Edge Lists
   2.4 Described Range of External Edges
3.0 Example Graph Analytic Process
   3.1 Preparation
   3.2 Iteration
4.0 Message with Values
5.0 Excluding a Range of Edges
6.0 Inclusion Bitmap
7.0 Hardware Overview

1.0 General Overview

Computerized techniques are provided for improving performance of indexing data transferred between machines in distributed graph processing. In an embodiment, a system of computers divides a directed graph of vertices and edges into multiple logical partitions. The system of computers creates one partition per available computer and distributes each partition to a computer. Each computer builds four edge lists that enumerate external edges that connect the partition of the computer with a partition of a neighbor computer. Each of the four edge lists has external edges of a particular direction, which may be either inbound or outbound from the partition of the computer. Some of the edge lists are sorted by identifier of the vertex that terminates each edge. Other edge lists are sorted by identifier of the vertex that originates each edge.

In operation, the computers perform distributed analysis of the directed graph in iterations. Each iteration involves each computer processing its own partition and exchanging data about external edges and/or their connected vertices with its neighbor computers. Each computer uses one of its edge lists to compactly describe a range of external edges that connect to another partition of a neighbor computer. The computers exchange these described ranges with their neighbor computers during each iteration.

In an embodiment, the computers calculate dynamic values for external edges and exchange the described ranges along with the dynamic values. In embodiments, some external edges are excluded from transmission between computers. In an embodiment, the excluded edges are indicated by a bitmap in a message that is exchanged between computers. In an embodiment, counts of excluded edges are interleaved with edge values.

2.0 Example System of Computers

Figure 1:
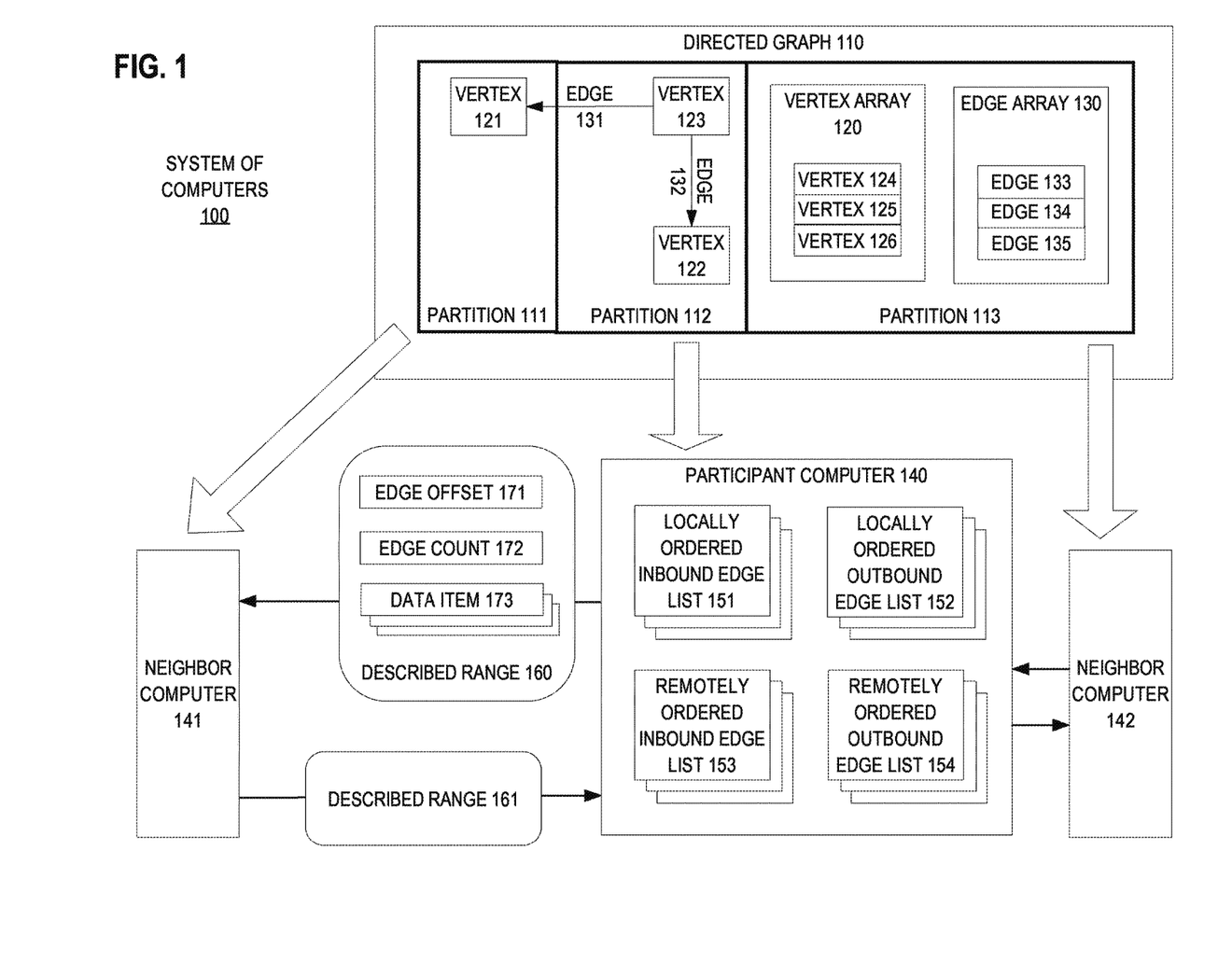
FIG. 1 is a block diagram that depicts an example system of computers that improves performance of indexing data transferred between machines in distributed graph processing, in an embodiment.

FIG. 1 is a block diagram that depicts an example system of computers 100, in an embodiment. System of computer 100 improves performance of indexing data transferred between machines in distributed graph processing.

System of computer 100 includes described ranges 160-161, directed graph 110, and computers 140-142. Each of computers 140-142 may be a rack server such as a blade, a personal computer, virtual machine, or other networked computer capable of graph processing. Computers 140-142 are networked with each other, perhaps by a local area network (LAN) or an internetwork such as the global Internet.

Directed graph 110 is a data structure that may be stored in a memory or a disk of one or more of computers 140-142 or remotely, such as in network attached storage. Directed graph 110 is composed of many vertices that are interconnected by many directed edges. In this example, directed graph 110 has vertices 121-126 and edges 131-135.

2.1 Graph Partitions

System of computers 100 may logically group the vertices and edges of directed graph 110 into partitions, with one partition for each of computers 140-142, such as partitions 111-113. Each of partitions 111-113 may have a different amount of vertices and edges. For example, partition 111 has one vertex, and partition 112 has two vertices. However, an expedient partitioning may involve partitions of equal size.

A partition may have an edge that is shared with another partition, as when the edge originates at a vertex in one partition and terminates at a vertex in another partition. For example, edge 131 originates at vertex 123 of partition 112 and terminates at vertex 121 of partition 111. As such, both of partitions 111-112 have edge 131.

An edge has a role that depends on the partitioning. For example, edge 131 is an outbound edge of partition 112 and an inbound edge of partition 111. Whereas, edge 132 is an internal edge of partition 112.

For demonstration, the edges and vertices of partitions 111-112 are shown as an interconnected topology that reflects logical structure instead of physical arrangement in storage. Whereas an embodiment may actually store vertices of each partition or the entire graph within an array of vertices and edges within an array of edges. This is shown as vertex array 120 and edge array 130 of partition 113.

2.2 Distributed Analytics

Each of computers 140-142 may have remote access to directed graph 110 that is centrally stored, perhaps in a cross-mounted filesystem. Alternatively, each of computers 140-142 may have its own copy of directed graph 110. In either case, system of computers 100 assigns each of partitions 111-113 to a respective computer 140-142. For example and although not shown, a central computer may send metadata that lists the vertices and edges of a respective partition to each of computers 140-142.

In operation, computers 140-142 collaborate at distributed processing of directed graph 110, such as performing the activity of a neural network. The distributed processing typically involves processing iterations. At each iteration, computers 140-142 perform analysis and exchange data with neighbor computers.

A neighbor computer is a computer that shares an edge with another computer because the edge connects two partitions. For example, neighbor computer 141 is a neighbor of participant computer 140 because edge 131 connects partitions 111-112 of computers 140-141.

2.3 Many Edge Lists

Initially, each computer builds four edge lists 151-154 for each neighbor computer with which it shares at least one edge. Because participant computer 140 has two neighbor computers 141-142, participant computer 140 builds eight edge lists, which are four edge lists 151-154 for communicating with neighbor computer 141 and another four edge lists 151-154 for communicating with neighbor computer 142. Although not shown, neighbor computers 141-142 also build edge lists for communicating with their neighbors.

Each edge list represents connections between two particular partitions in a particular direction. Each entry of an edge list represents an edge that connects those two partitions in that direction. No edge list has internal edges that originate and terminate within the same partition.

An entry may have fields such as an identifier of the edge, an identifier of the originating vertex of the edge, and an identifier of the terminating vertex of the edge. Each entry is implicitly identified by its offset within an edge list.

The set of edges of a computer, such as 140, that connect two partitions may be segregated, based on direction, into outbound edges that originate within partition 112 and inbound edges that terminate within that partition. In this example, partition 112 has outbound edge 131 and no inbound edges.

Two of the four edge lists have outbound edges. The other two of the four edge lists have inbound edges.

Locally-ordered outbound edge list 152 and remotely-ordered outbound edge list 154 have the same outbound edges. Likewise, locally-ordered inbound edge list 151 and remotely-ordered inbound edge list 153 have the same inbound edges.

However, each of edge lists 151-154 is sorted differently. Locally-ordered inbound edge list 151 is primarily sorted by the offset of each inbound edge's terminating vertex. Remotely-ordered inbound edge list 153 has the same entries for the same edges. However, remotely-ordered inbound edge list 153 is primarily sorted by the offset of each inbound edge's originating vertex.

Likewise, locally-ordered outbound edge list 152 is primarily sorted by the offset of each outbound edge's originating vertex. Remotely-ordered outbound edge list 154 has the same entries for the same edges. However, remotely-ordered outbound edge list 154 is primarily sorted by the offset of each outbound edge's terminating vertex.

As such, locally-ordered edge lists 151-152 are primarily sorted by the local vertex within the partition of the computer that built the list. Whereas, remotely-ordered edge lists 153-154 are primarily sorted by the remote vertex within the partition of the neighbor computer.

When respective partitions of two computers, such as 140-141, are connected by at least one edge in a particular direction, then the two computers have similar edge lists. For example, locally-ordered inbound edge list 151 of participant computer 140 has the same contents and the same effective sorting as the remotely-ordered outbound edge list of neighbor computer 141. Likewise, remotely-ordered inbound edge list 153 of participant computer 140 has the same contents and the same effective sorting as the locally-ordered outbound edge list of neighbor computer 141. Likewise, locally-ordered outbound edge list 152 of participant computer 140 has the same contents and the same effective sorting as the remotely-ordered inbound edge list of neighbor computer 141. Likewise, remotely-ordered outbound edge list 154 of participant computer 140 has the same contents and the same effective sorting as the locally-ordered inbound edge list of neighbor computer 141.

As such and regardless of edge direction and which computer is the neighbor, both of computers 140-141 have some edge list that has the same edges and is effectively sorted in the same order. Hence, any edge of a particular direction between computers 140-141 may be identified to both computers by the same edge list offset. However, which edge list does the offset regard depends on which of computers 140-141 sends a described range that contains the edge and which direction does the edge have.

For example, partitions 111-112 share only edge 131. Because it is the only shared edge, it will be the first entry in the relevant edge list of both computers. As such, both of computers 140-141 may refer to edge 131 by its zero-based offset, which in this example is necessarily zero, since it is the only shared edge.

That is, an external edge that joins two partitions will appear in an edge list for each of the partitions. The offset of the edge into both edge lists should be identical. As such, that offset may contextually identify that edge amongst the two computers that have the partitions connected by that edge. However, an edge may also have an identifier that is independent of any edge list. For example, all computers may identify the same edge with the same global identifier of the edge. Alternatively, each computer may have its own private identifier for that edge. No matter how an edge is identified, when computers communicate with each other about an edge, the edge is identified only by its shared offset into relevant edge lists.

Edge list construction is a preparatory activity that occurs once and before iterative graph processing begins, such as during graph loading by computers 140-142. During analytical iteration, system of computers 100 may treat the edge lists as immutable. In an embodiment that rebalances the workload within system of computers 100 before all analytical iterations are complete, rebalancing may involve repartitioning the graph and rebuilding the edge lists.

2.4 Described Range of External Edges

A dynamic aspect of system of computers 100 is the exchange of described ranges between neighboring computers during each iteration. A described range, such as 160-161, is the unit of information exchange between neighbors. For example, described range 160 may be a message sent over a network or through a filesystem from participant computer 140 to neighbor computer 141 during an iteration.

Each described range 160-161 has metadata that describes which edges contributed data to the message. This metadata has offsets of edges within one edge list of each of two partitions that are connected by those edges.

Each described range 160-161 has edge offset 171, edge count 172, and a set of data items 173. Edge offset 171 indexes the first edge of a range of edges that are contiguous within an edge list.

If offset zero appears in described range 160 sent by participant computer 140, then offset zero regards locally-ordered outbound edge list 152 of participant computer 140 and also regards the remotely-ordered inbound edge list of neighbor computer 141. In either edge list, offset zero indexes edge 131.

Generally, edge count 172 also serves as a count of data items 173. There may be one data item 173 per edge within described range 160. Each data item 173 may bear the dynamic value of a corresponding edge of described range 160. For example, one data item 173 may have the weight value of edge 131, such as when directed graph 110 is a neural network. Data items 173 are sorted by edge in the same order as the edge list to which described range 160 pertains.

In some cases, the edges of a particular vertex (or all vertices) do not have a corresponding data item 173. This occurs when a vertex has its own dynamic value that may be reused for all of the edges of the vertex. For example, a vertex with two edges that share the dynamic value of the vertex may cause only one data item 173 to be included for both edges, instead of a separate data item 173 for each of both edges.

Neighbor computer 141 may receive described range 160. While neighbor computer 141 iterates over its own remotely-ordered edge list, neighbor computer 141 generally consumes one data item 173 per edge within described range 160. However, if a dynamic value of a vertex within a single data item 173 represents dynamic values of all of the edges of the vertex, then neighbor computer 141 reuses the same data item 173 until a row with a different source vertex ID is encountered within described range 160.

FIG. 1 shows two described ranges 160-161 exchanged between computers 140-141. However during one iteration over a small graph, there may be as many as four described ranges exchanged between computers 140-141. Edges may be inbound or outbound, and for each of those edge directions, a computer may send a described range and receive a described range. A described range may also be sent in the opposite direction of the edges of the described range. For example, edge 131 is included in both of described ranges 160-161, which are sent in opposite directions, even though edge 131 itself only has one direction. That is, an edge may be included in one described range sent by each of computers 140-141 during an iteration. However, another two of the four described ranges exchanged by those computers will not include that edge, because the direction of that edge does not match the direction of the edges in the other two described ranges.

In an embodiment, during an iteration over a large graph, a large described range may be exchanged as several smaller described ranges. For example, described ranges may be limited to at most some fraction of the graph or some absolute amount of edges.

As such, offset zero regards different edge lists when sent within described range 161 instead of described range 160. For described range 161, offset zero regards the locally-ordered inbound edge list of neighbor computer 141 and also regards the remotely-ordered outbound edge list of participant computer 140. A more detailed demonstration of edge list contents is presented later herein.

Described range 160 may designate multiple edges that are contiguous within an edge list. Edge offset 171 specifies the offset, within the edge list, of the first of the contiguous edges. The operation of edge count 172 depends on which embodiment. How many contiguous edges are designated by described range 160 may be specified by edge count 172.

For example, a partition may have only three edges, all of which are in the same edge list. Those three edges may populate a described range having an edge offset of zero. Offset zero specifies the first edge of the edge list. Likewise, the edge count would be three.

In an embodiment, a described range may have gaps of missing data items 173 that are indicated as missing. For example and although not shown, edge count 172 may be supplemented by a bitmap that lists the absence or presence of every data item 173 within a described range. In this embodiment, gaps do not alter edge count 172 of a described range. Data items 173 are tallied by edge count 172 regardless of whether they are actually present within a described range. Data items 173 may be serialized as a contiguous array of values, even when some items are missing.

In an embodiment and although not shown, gaps of missing data items 173 are indicated by a set of pairs that each indicates an offset and count of contiguous missing data items 173. The set of pairs may be serialized in an array that indicates gaps. In this embodiment, a described range with gaps may have an edge count 172 that is reduced by the amount of missing data items 173. Only data items 173 that are actually present within a described range are tallied by edge count 172.

3.0 Example Graph Analytic Process

Figure 2:
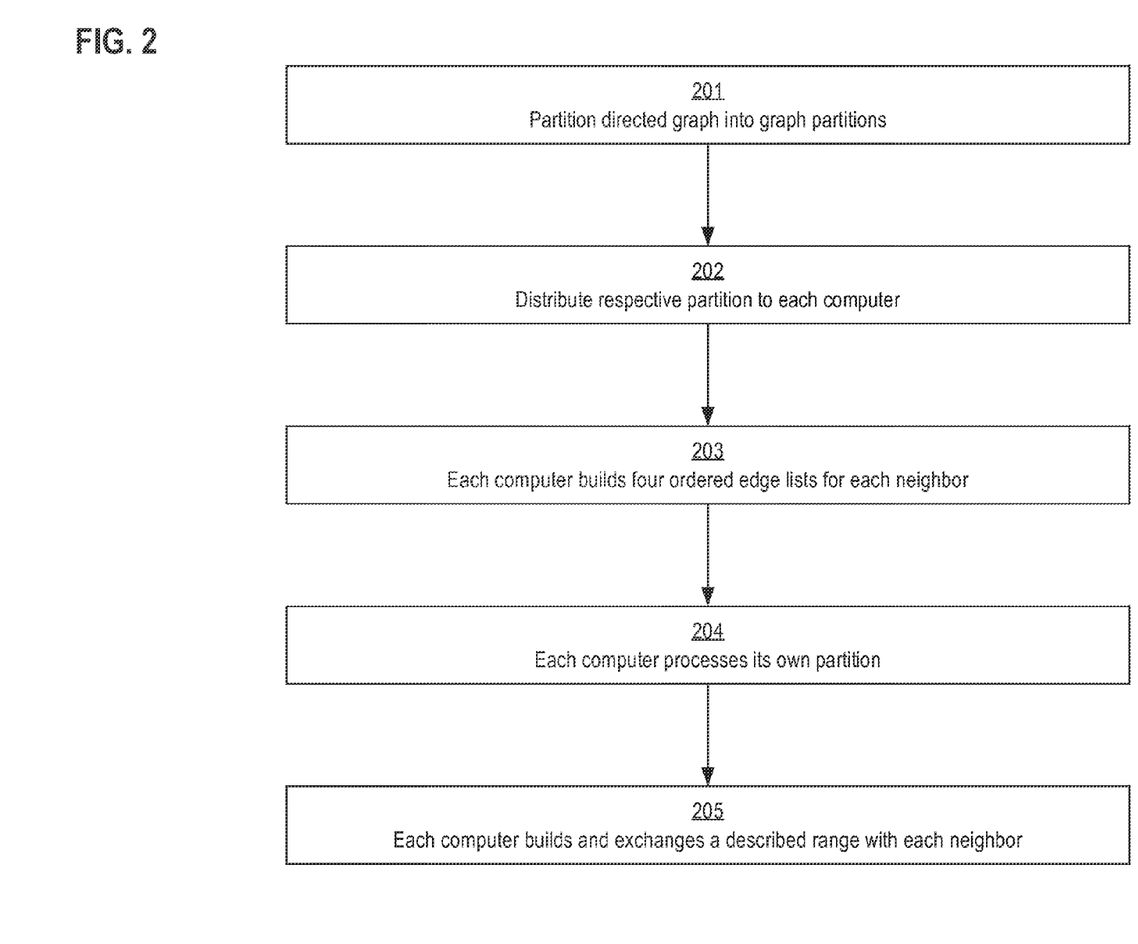
FIG. 2 is a flow diagram that depicts an example process for improving performance of indexing data, in an embodiment.

FIG. 2 is a flow diagram that depicts an example process that improves performance of indexing data transferred between machines in distributed graph processing, in an embodiment. The graph analytic process is described in the context of FIG. 1.

3.1 Preparation

Steps 201-203 are preparatory and occur before graph analysis starts. In step 201, a directed graph is divided into logical partitions. For example, system of computers 100 divides directed graph 110 into as many partitions 111-113 as there are available computers 140-142.

A ceiling on how many partitions may be created is that each partition must have at least one vertex. As such, there are not more partitions than vertices within directed graph 110. Likewise, distributed processing requires at least two computers. As such, there are not fewer than two partitions.

The logic of partitioning may be performed by a central computer, that may or may not participate in the distributed graph processing that occurs after this preparation. In an embodiment, the logic of partitioning is itself distributed. For example, each available computer may know how many other computers are available, the size of directed graph 110, and so deduce how much content should each partition have.

Likewise, each available computer may know its own position within an ordering of available computers, and so deduce which portion of graph content should occur within its partition. For example, directed graph 110 may be encoded as an array of all vertices. Each available computer may deduce which interval within the array of all vertices should occur within its partition.

In step 202, a partition is distributed to each available computer. For example, a central computer may use a communication network to tell each available computer about which vertices occur within its partition. If there is no central computer, then each available computer has already decided the content of its own partition during step 201.

In either case, each available computer may make or already have pre-staged a copy of the entirety of directed graph 110. Directed graph 110 may be centrally stored and remotely accessible by cross mounted filesystem or other distribution mechanism.

In step 203, each computer builds four ordered edge lists for each neighboring computer. For example if directed graph 110 has three fully bi-directionally connected partitions, then each partition is bi-directionally connected to both of the other two partitions. As such, each computer has two neighbor computers and builds four edge lists for each of those two neighbors. Therefore, each computer would build eight (8=4×2) edge lists.

The more neighbors, then the more sets of four edge lists must a computer build. However depending on the topology and partitioning of directed graph 110, not all available computers need have the same amount of neighbors. The partitioning during step 201 may deliberately create partitions with equal amounts of neighboring partitions, equal amounts of external edges between partitions, equal amounts of internal edges or vertices, or use other balancing heuristics.

The edge lists occupy volatile or non-volatile random access memory (RAM) for fast access. Directed graph 110 may occupy memory or disk. Each edge list may be a linked list for sequential access or an array for random access.

3.2 Iteration

After preparation, graph analysis occurs in iterations. Each iteration performs steps 204-205. For example, directed graph 110 may be a neural network. Training the neural network may involve iterations of graph processing that each includes steps 204-205.

In step 204, each computer processes its own partition. For example, each computer may apply an algorithm to the vertices and edges of its own partition. Each computer may derive new dynamic values associated with edges and vertices based on the state of those values from the previous iteration.

In step 205, each computer builds and exchanges a described range of edges with each neighbor computer. For example, a computer may have calculated dynamic values for external edges during step 204 or earlier, perhaps during a prior iteration, and perhaps to avoid a race condition. Those external edges may be identified by their offsets within an edge list, such as 151-154. Those offsets and dynamic values of those external edges may be specified in described ranges, such as 160-161, that may be transmitted to neighbor computers.

Likewise, neighbor computers may transmit their own described ranges. As such, a computer may send different described ranges to different neighbor computers and receive different described ranges from those neighbors.

In an embodiment, step 205 is performed before step 204. In an embodiment, steps 204-205 are performed concurrently.

In an embodiment after steps 204-205, an iteration is complete and a following iteration with the same steps may start. In an embodiment, additional processing occurs after steps 204-205 before the next iteration begins. For example, each computer may log iteration data to a file. An embodiment may have termination criteria that decide which iteration is the last.

4.0 Message with Values

Figure 3:
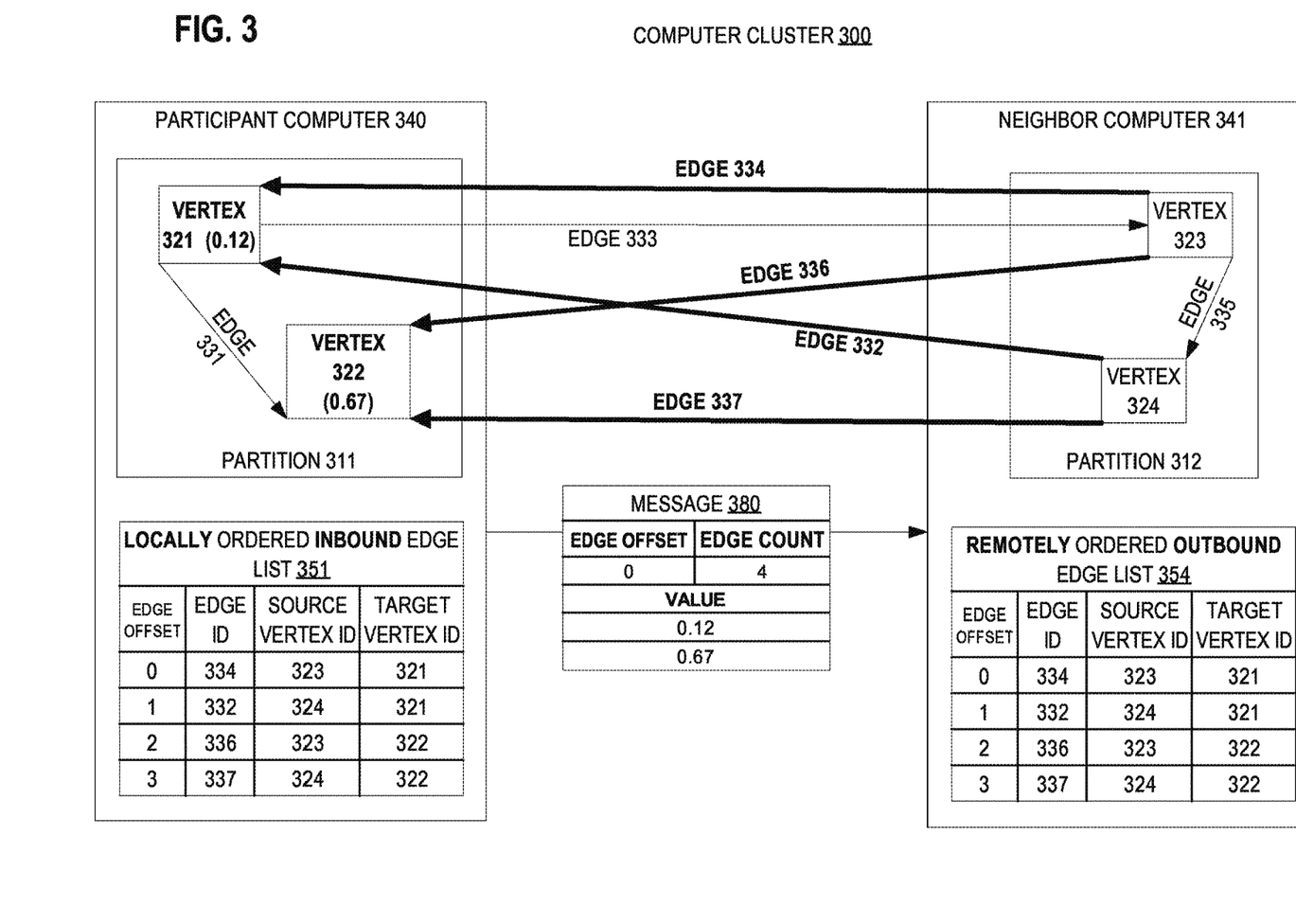
FIG. 3 is a block diagram that depicts an example system of computers that improves performance of indexing data transferred between machines, in an embodiment.

FIG. 3 is a block diagram that depicts an example computer cluster 300, in an embodiment. Computer cluster 300 uses a structured message to transfer a described range that has dynamic values.

Computer cluster 300 may be an implementation of system of computers 100. Computer cluster 300 includes computers 340-341, between which is transferred message 380.

Computers 340-341 have respective graph partitions 311-312, which are connected to each other by external edges 332-334 and 336-337. During each iteration, computers 340-341 may exchange described ranges with each other. Each message, such as 380, contains one described range.

However, each described range may designate only external edges having a same direction. This is because a described range has an edge offset for use with an edge list, and an edge list only has edges of a same direction. As such, described ranges 360 only have external edges that originate in partition 312 and terminate in partition 311. Thus, the described range of message 380 designates inbound edges of partition 311.

Even though an edge has only one direction, the edge may be included within a described range sent in one direction from participant computer 340 to neighbor computer 341 and within another described range sent in the opposite direction from neighbor computer 341 to participant computer 340. In this example, described ranges 360 is sent from participant computer 340 to neighbor computer 341, even though the edges designated by described ranges 360 are oriented in the opposite direction. Message 380 also conveys dynamic values from participant computer 340 to neighbor computer 341, shown in the "value" column of message 380. In this example, individual edges of the described range of message 380 do not transmit dynamic values. Instead, dynamic values of vertices are transmitted in message 380. In this example, the inbound edges of partition 311 are edges 332, 334, and 336-337, which terminate at vertices 321-322. As such, only the dynamic values (0.12 and 0.67) of vertices 321-322 are sent within message 380. Nonetheless, these two dynamic values apply to four edges. As such, the edge count of message 380 is four, even though only two dynamic values are sent.

Locally-ordered inbound edge list 351 is primarily sorted by the offset of each edge's terminating vertex within partition 311, shown as the "target vertex ID" column within locally-ordered inbound edge list 351. Although edges 332 and 334 originate from different vertices within partition 312, both of these edges sort together because they terminate at the same vertex 321 of partition 311.

Since the terminating vertex is a sorting key for locally-ordered inbound edge list 351, edges 332 and 334 remain together when sorted and are shown within locally-ordered inbound edge list 351 as the rows having edge offsets zero and one. Because there are four edges (332, 334, and 336-337) in this described range, its edge count is four.

In summary, participant computer 340 uses the contents of its partition 311 and locally-ordered inbound edge list 351 when populating message 380 with data. However, these are not used for interpreting message 380 when received by neighbor computer 341. Neighbor computer 341 instead uses its own remotely-ordered outbound edge list 354 when interpreting message 380.

By design, remotely-ordered outbound edge list 354 and locally-ordered inbound edge list 351 have the same core data. For example, those two edge lists may be identical, despite having been built by different computers. Participant computer 340 uses edge offsets of locally-ordered inbound edge list 351 to build message 380. Upon receipt, neighbor computer 341 may use the edge offsets of message 380 to identify the same edges within remotely-ordered outbound edge list 354. For example, the row with edge offset zero has the same data in both of remotely-ordered outbound edge list 354 and locally-ordered inbound edge list 351.

5.0 Excluding a Range of Edges

Figure 4:
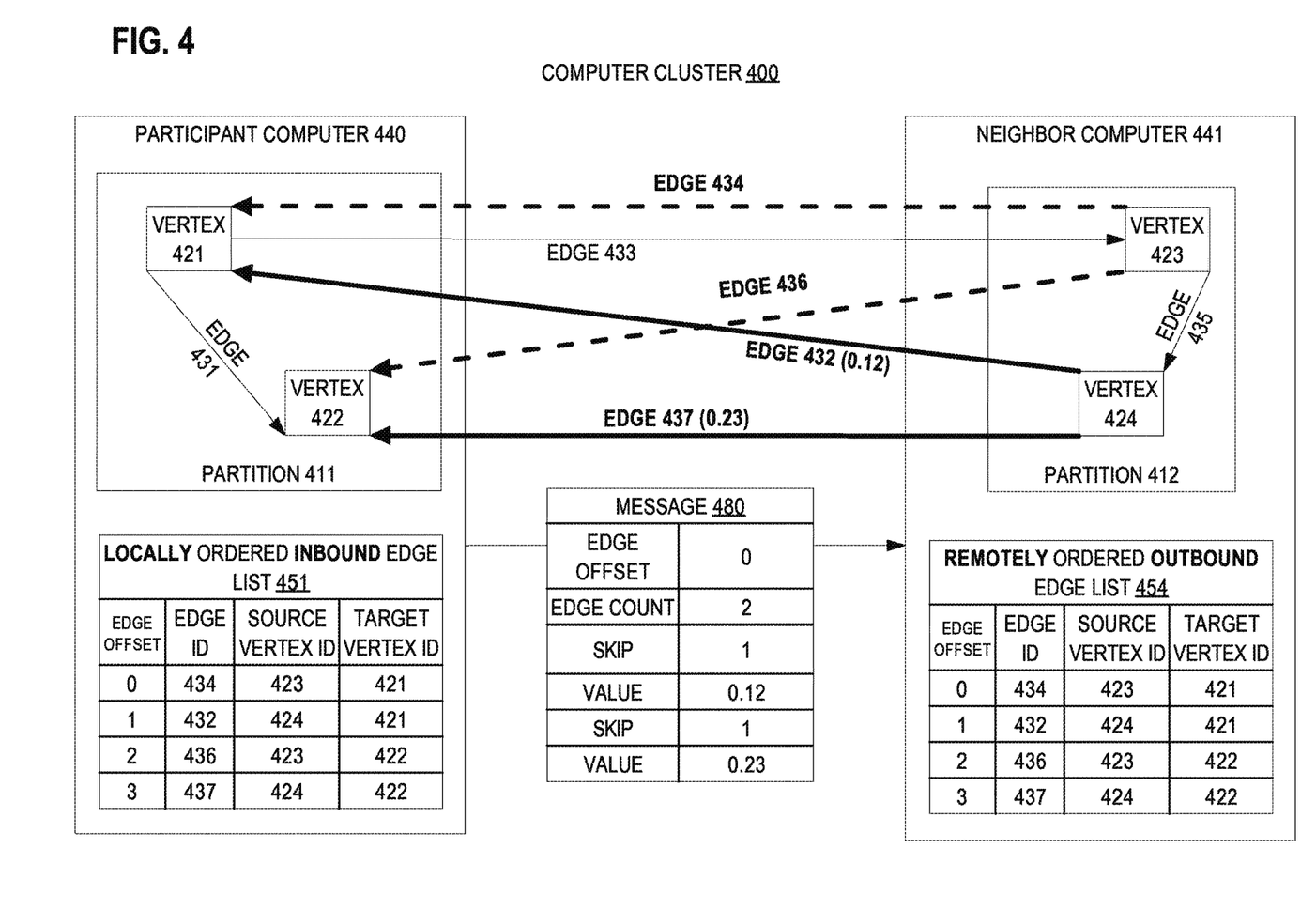
FIG. 4 is a block diagram that depicts an example system of computers that improves performance of indexing data transferred between machines, in an embodiment.

FIG. 4 is a block diagram that depicts an example computer cluster 400, in an embodiment. When building a message, computer cluster 400 may exclude some external edges that ordinarily would be included. This may accelerate production, transfer, and consumption of the message.

Computer cluster 400 may be an implementation of system of computers 100. Computer cluster 400 includes computers 440-441, between which is transferred message 480. Computers 440-441 have respective graph partitions 411-412, which are connected to each other by external edges 432-434 and 436-437.

Depending on a particular graph analysis application, computers 440-441 may sometimes avoid communicating some external edges to a neighbor during an iteration. For example for efficiency, computers 440-441 may be configured to avoid sending dynamic values for edges that are irrelevant to the current iteration.

In this example, participant computer 440 may ordinarily send information about all of inbound edges 432, 434, and 436-437 in a message to neighbor computer 441. However also in this example, edges 432 and 437 have dynamic values to send because these edges are relevant during the current iteration, but edges 434 and 436 do not send values because they are no longer part of the graph computation, due to conditions of whatever graph algorithm is involved.

Within message 480, participant computer 440 may designate some edge ranges as excluded. For example, edges 434 and 436 may be designated within ranges of excluded edges. Each excluded range is shown in message 480 with a "skip" heading and an edge count of one, because each of edges 434 and 436 are individually excluded. Because edges 434 and 436 are not contiguous within locally ordered inbound edge list 451, these two edges are not combined into a single excluded range.

Although the left column of message 480 shows headings, these headings are for illustration only. The wire format of message 480 need have only the values of the right column, with their meanings understood by convention and position.

Skip counts and dynamic values alternate within message 480. Before each of the two dynamic values (0.12 and 0.23) is a count of edges to exclude. The values of one indicate how many edges are excluded by each gap. A value of one indicates that only a count of one edge is excluded by a given gap.

In this example, only edges 432 and 437 contribute dynamic values to message 480. As such the edge count of the described range of message 480 is only two, because this embodiment does not tally excluded edges for the edge count of the described range.

Figure 5:
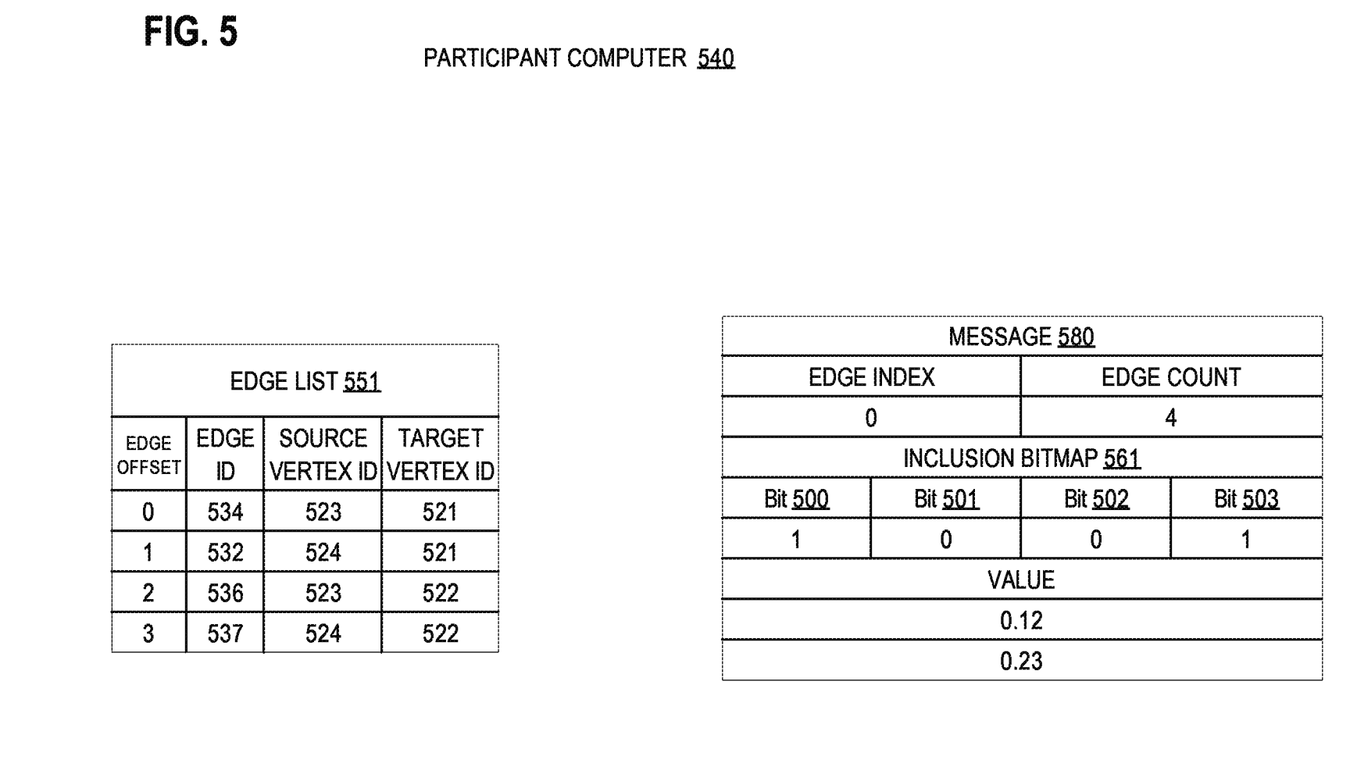
FIG. 5 is a block diagram that depicts an example computer that improves performance of indexing data, in an embodiment.

In an embodiment, the skips encoded within message 580 indicate vertices, instead of edges, to exclude. In this case, the receiving computer consume the next skip and value pair until a row with a different source vertex ID is encountered.

6.0 Inclusion Bitmap

FIG. 5 is a block diagram that depicts an example participant computer 540, in an embodiment. Participant computer 540 may be an implementation of participant computer 140 or 340. Participant computer 540 uses a bitmap to indicate included data items.

Participant computer 540 includes edge list 551 and message 580. Participant computer 540 uses edge list 551 to build message 580. Edge list 551 has four edges, with respective offsets of zero through three. However, not all four edges need be represented in within described edge ranges 560 of message 580.

The presence or absence of each of those four edges is indicated in inclusion bitmap 561 of message 580. Bitmap 561 is a sequence of bits 500-503. Each of bits 500-503 respectively corresponds to each of the four edges of edge list 551. When a bit is set, the corresponding edge contributes a dynamic value to message 580. When a bit is clear, the corresponding edge is excluded.

Participant computer 540 builds message 580 during an iteration of graph analysis. During the current iteration, edges 532 and 536 do not transmit values and are excluded from message 580. However, edges 534 and 537 do have values (0.12 and 0.23) to transmit. As such, participant computer 540 sets bits 500 and 503 to indicate the presence of edges 534 and 537 and clears bits 501-502 to indicate the absence of dynamic values for edges 532 and 536. Upon receipt of message 580 and although not shown, a neighbor computer may check bits 500-503 to determine which edges are present or absent within described ranges 560. In this embodiment, all edges contribute to the edge count of the described range, regardless of which edges are marked as included by inclusion bitmap 561. As such, the edge count is four, even though inclusion bitmap 561 indicates that only two edges contribute dynamic values.

Bitmapped message 580 is an alternative to ranges of excluded edges of message 480 of FIG. 4. When many edges are excluded or excluded edges are clustered together in the edge list, the described range of excluded edges of message 480 is a more space efficient way of indicating excluded edges. Whereas, a random assortment of few excluded edges is more space efficiently indicated by bitmap 561.

In an embodiment, participant computer 540 dynamically selects the more space efficient way to indicate excluded edges when building message 580. Although not shown, message 580 may include a logical flag that indicates whether or not bitmap 561 is used to indicate excluded edges. If bitmap 561 is not used, then it need not be included in message 580 by participant computer 540.

In an embodiment, the bits of bitmap 561 indicate vertices, instead of edges, to include. In this case, each bit corresponds to a vertex instead of an edge. The receiving computer starts processing edges at the start edge index and examines the next bit in the bitmap when a row with a different source vertex ID is encountered. If the bit is set, it reads the next data value and applies it to all subsequent rows until it encounters a different source vertex ID. If the bit is not set, it skips all subsequent rows until it encounters a different source vertex ID.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
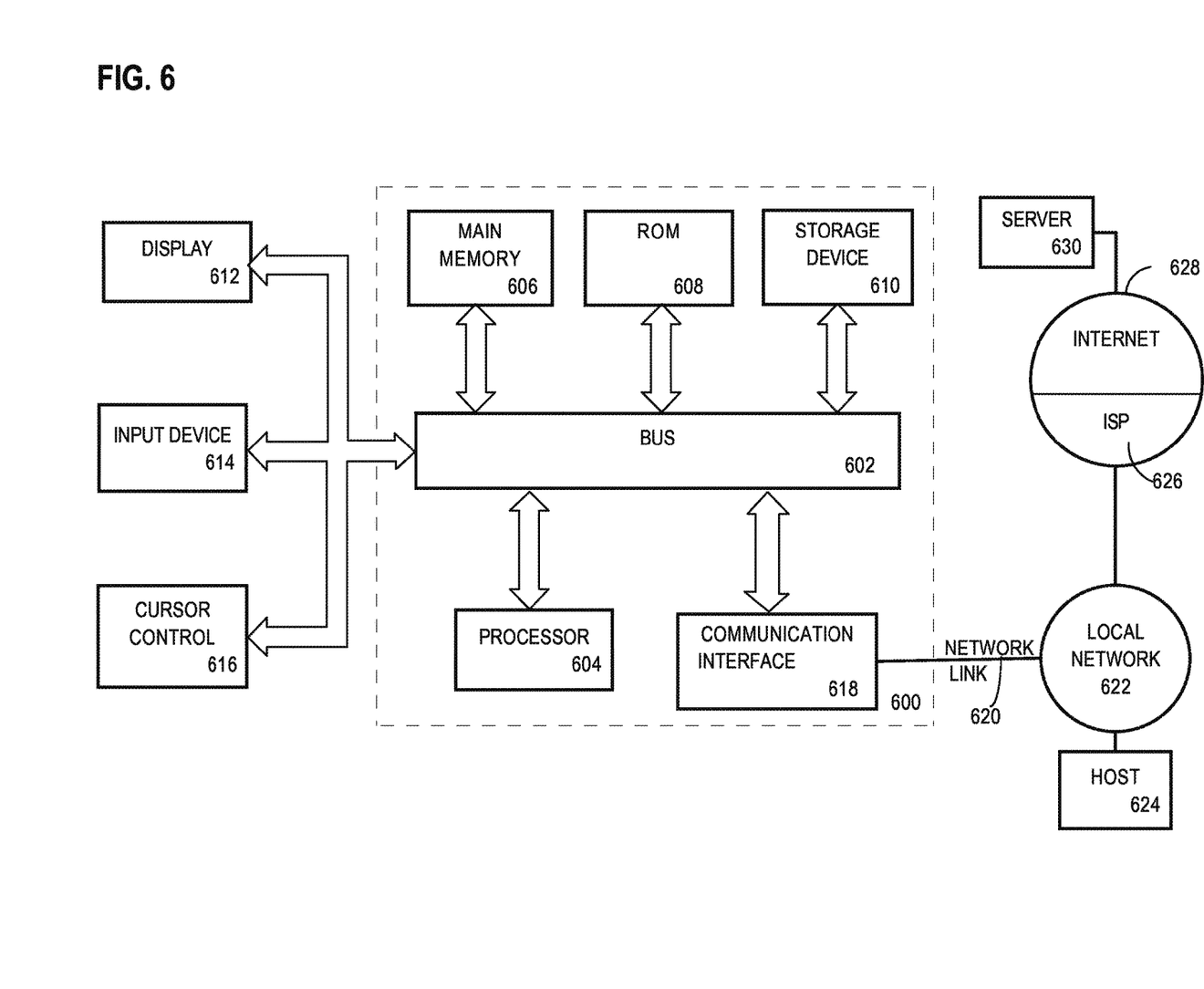
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
    partitioning a directed graph into a plurality of graph partitions, wherein said directed graph comprises vertices connected by edges, wherein each graph partition of said plurality of graph partitions comprises a subset of said vertices and a subset of said edges;
    distributing each of said plurality of graph partitions to a respective computer of a plurality of computers;
    for each participant computer of said plurality of computers, performing:
        for each neighbor computer of said plurality of computers, wherein said each neighbor computer is not said each participant computer, performing:
            building a locally-ordered inbound list of edges that originate at an originating vertex of the graph partition of said each neighbor computer and terminate at a terminating vertex of the graph partition of said each participant computer, wherein said locally-ordered inbound list is primarily ordered by an identifier of the terminating vertex;
            building a remotely-ordered inbound list of edges that originate at an originating vertex of the graph partition of said neighbor computer and terminate at a terminating vertex of the graph partition of said each participant computer, wherein said remotely-ordered inbound list is primarily ordered by an identifier of the originating vertex;
            building a locally-ordered outbound list of edges that originate at an originating vertex of the graph partition of said each participant computer and terminate at a terminating vertex of the graph partition of said neighbor computer, wherein said locally-ordered outbound list is primarily ordered by an identifier of the originating vertex; and
            building a remotely-ordered outbound list of edges that originate at an originating vertex of the graph partition of said each participant computer and terminate at a terminating vertex of the graph partition of said neighbor computer, wherein said remotely-ordered outbound list is primarily ordered by an identifier of the terminating vertex;
        processing the graph partition of said each participant computer;
        for each neighbor computer of said plurality of computers, wherein said neighbor computer is not said each participant computer, performing:
            building and sending, from said each participant computer to said each neighbor computer, a described range of edges of the graph partition of said each participant computer, wherein said described range of edges of the graph partition of said each participant computer comprises at least: the offset of a particular edge within said locally-ordered inbound list or said locally-ordered outbound list, and a count not exceeding a count of contiguous subsequent edges within said locally-ordered inbound list or said locally-ordered outbound list;
            receiving, from said neighbor computer by said each participant computer, and processing a described range of edges of the graph partition of said neighbor computer, wherein said described range of edges of the graph partition of said each neighbor computer comprises at least: the offset of a particular edge within said remotely-ordered inbound list or said remotely-ordered outbound list, and a count not exceeding a count of contiguous subsequent edges within said remotely-ordered inbound list or said remotely-ordered outbound list.

2. The method of claim 1 wherein each entry, of said locally-ordered inbound list and said locally-ordered outbound list, comprises an identifier of the edge of said each entry, an identifier of the source vertex of the edge of said each entry, and an identifier of the terminating vertex of said edge of said entry.

3. The method of claim 1 wherein each entry, of said remotely-ordered inbound list and said remotely-ordered outbound list, comprises: an identifier of the edge of said each entry, an identifier of the source vertex of the edge of said each entry, and an identifier of the terminating vertex of said edge of said each entry.

4. The method of claim 1 wherein:
said locally-ordered inbound list is secondarily ordered by an identifier of the originating vertex of the edge of each entry of said locally-ordered inbound list;
said remotely-ordered inbound list is secondarily ordered by an identifier of the terminating vertex of the edge of each entry of said remotely-ordered inbound list;
said locally-ordered outbound list is secondarily ordered by an identifier of the terminating vertex of the edge of each entry of said locally-ordered outbound list;
said remotely-ordered outbound list is secondarily ordered by an identifier of the originating vertex of the edge of each entry of said remotely-ordered outbound list;
said locally-ordered inbound list and said locally-ordered outbound list are tertiarily ordered by an identifier of the edge of each entry of said locally-ordered inbound list or said locally-ordered outbound list.
said remotely-ordered inbound list and said remotely-ordered outbound list are tertiarily ordered by an identifier of the edge of each entry of said remotely-ordered inbound list or said remotely-ordered outbound list.

5. The method of claim 1 wherein said described range of edges of the graph partition of said each participant computer further comprises a bitmap that indicates edges to include from said described range of edges of the graph partition of said each participant computer.

6. The method of claim 1 wherein said described range of edges of the graph partition of said each participant computer further comprises, prior to each value stored in an associated message, a count that indicates the number of entries to skip in an enumeration of the corresponding edge lists such that the first one or more subsequent entries in the edge list must correspond to the value stored in the associated message immediately after the count.

7. The method of claim 1 wherein said described range of edges of the graph partition of said each participant computer further comprises an indication of edges to exclude or include from said described range of edges of the graph partition of said each participant computer, wherein said building said described range of edges of the graph partition of said each participant computer comprises encoding of said indication by one of: a bitmap or a list of edge counts to skip.

8. The method of claim 1 repeated when said directed graph is repartitioned.

9. The method of claim 1 wherein said building and sending a described range of edges of the graph partition of said each participant computer, said receiving and processing a described range of edges of the graph partition of said each neighbor computer, and said processing the graph partition occur during iterations that are performed by said plurality of computers.

10. The method of claim 1 wherein:
said processing the graph partition comprises determining, for each of a subset of edges of said graph partition, an edge value or determining, for each of a subset of vertices of said graph partition, a vertex value;
said described range of edges of the graph partition of said each participant computer further comprises said edge values or said vertex values.

11. One or more non-transitory computer-readable media storing instructions, wherein the instructions include:
first instructions which, when executed by one or more processors, cause partitioning a directed graph into a plurality of graph partitions, wherein said directed graph comprises vertices connected by edges, wherein each graph partition of said plurality of graph partitions comprises a subset of said vertices and a subset of said edges;
second instructions which, when executed by one or more processors, cause distributing each of said plurality of graph partitions to a respective computer of a plurality of computers;
third instructions which, when executed by one or more processors, cause for each participant computer of said plurality of computers, performing:
for each neighbor computer of said plurality of computers, wherein said each neighbor computer is not said each participant computer, performing:
building a locally-ordered inbound list of edges that originate at an originating vertex of the graph partition of said neighbor computer and terminate at a terminating vertex of the graph partition of said each participant computer, wherein said locally-ordered inbound list is primarily ordered by an identifier of the terminating vertex;
building a remotely-ordered inbound list of edges that originate at an originating vertex of the graph partition of said each neighbor computer and terminate at a terminating vertex of the graph partition of said each participant computer, wherein said remotely-ordered inbound list is primarily ordered by an identifier of the originating vertex;
building a locally-ordered outbound list of edges that originate at an originating vertex of the graph partition of said each participant computer and terminate at a terminating vertex of the graph partition of said neighbor computer, wherein said locally-ordered outbound list is primarily ordered by an identifier of the originating vertex; and
building a remotely-ordered outbound list of edges that originate at an originating vertex of the graph partition of said each participant computer and terminate at a terminating vertex of the graph partition of said neighbor computer, wherein said remotely-ordered outbound list is primarily ordered by an identifier of the terminating vertex;
processing the graph partition of said each participant computer;
for each neighbor computer of said plurality of computers, wherein said neighbor computer is not said each participant computer, performing:
building and sending, from said each participant computer to said each neighbor computer, a described range of edges of the graph partition of said each participant computer, wherein said described range of edges of the graph partition of said each participant computer comprises at least:
the offset of a particular edge within said locally-ordered inbound list or said locally-ordered outbound list, and a count not exceeding a count of contiguous subsequent edges within said locally-ordered inbound list or said locally-ordered outbound list;

receiving, from said neighbor computer by said each participant computer, and processing a described range of edges of the graph partition of said neighbor computer, wherein said described range of edges of the graph partition of said each neighbor computer comprises at least: the offset of a particular edge within said remotely-ordered inbound list or said remotely-ordered outbound list, and a count not exceeding a count of contiguous subsequent edges within said remotely-ordered inbound list or said remotely-ordered outbound list.

12. The one or more non-transitory computer-readable media of claim 11 wherein each entry, of said locally-ordered inbound list and said locally-ordered outbound list, comprises an identifier of the edge of said each entry, an identifier of the source vertex of the edge of said each entry, and an identifier of the terminating vertex of said edge of said each entry.

13. The one or more non-transitory computer-readable media of claim 11 wherein each entry, of said remotely-ordered inbound list and said remotely-ordered outbound list, comprises: an identifier of the edge of said each entry, an identifier of the source vertex of the edge of said each entry, and an identifier of the terminating vertex of said edge of said each entry.

14. The one or more non-transitory computer-readable media of claim 11 wherein:
said locally-ordered inbound list is secondarily ordered by an identifier of the originating vertex of the edge of each entry of said locally-ordered inbound list;
said remotely-ordered inbound list is secondarily ordered by an identifier of the terminating vertex of the edge of each entry of said remotely-ordered inbound list;
said locally-ordered outbound list is secondarily ordered by an identifier of the terminating vertex of the edge of each entry of said locally-ordered outbound list;
said remotely-ordered outbound list is secondarily ordered by an identifier of the originating vertex of the edge of each entry of said remotely-ordered outbound list;
said locally-ordered inbound list and said locally-ordered outbound list are tertiarily ordered by an identifier of the edge of each entry of said locally-ordered inbound list or said locally-ordered outbound list;
said remotely-ordered inbound list and said remotely-ordered outbound list are tertiarily ordered by an identifier of the edge of each entry of said remotely-ordered inbound list or said remotely-ordered outbound list.

15. The one or more non-transitory computer-readable media of claim 11 wherein said described range of edges of the graph partition of said each participant computer further comprises a bitmap that indicates edges to include from said described range of edges of the graph partition of said each participant computer.

16. The one or more non-transitory computer-readable media of claim 11 wherein said described range of edges of the graph partition of said each participant computer further comprises, prior to each value stored in an associated message, a count that indicates the number of entries to skip in an enumeration of the corresponding edge lists such that the first one or more subsequent entries in the edge list must correspond to the value stored in the associated message immediately after the count.

17. The one or more non-transitory computer-readable media of claim 11 wherein said described range of edges of the graph partition of said each participant computer further comprises an indication of edges to exclude or include from said described range of edges of the graph partition of said each participant computer, wherein said building said described range of edges of the graph partition of said each participant computer comprises encoding of said indication by one of: a bitmap or a list of edge counts to skip.

18. The one or more non-transitory computer-readable media of claim 11 further including repartition instructions which, when said directed graph is repartitioned and said repartition instructions are executed by one or more processors, cause execution of said first instructions, said second instructions, and said third instructions.

19. The one or more non-transitory computer-readable media of claim 11 further including instructions which, when executed by one or more processors during successive iterations that are performed by said plurality of computers, cause execution of said building and sending a described range of edges of the graph partition of said each participant computer, said receiving and processing a described range of edges of the graph partition of said each participant computer, and said processing the graph partition.

20. The one or more non-transitory computer-readable media of claim 11 wherein:
said processing the graph partition comprises determining, for each of a subset of edges of said graph partition, an edge value or determining, for each of a subset of vertices of said graph partition, a vertex value;
said described range of edges of the graph partition of said each participant computer further comprises said edge values or said vertex values.

\* \* \* \* \*

UNITED STATES PATENT AND TRADEMARK OFFICE
CERTIFICATE OF CORRECTION

PATENT NO. : 10,002,205 B2
APPLICATION NO. : 14/947382
DATED : June 19, 2018
INVENTOR(S) : Roth et al.

Page 1 of 1

It is certified that error appears in the above-identified patent and that said Letters Patent is hereby corrected as shown below:

In the Claims

In Column 14, Line 17, in Claim 1, after "said" insert -- each --.

In Column 14, Line 26, in Claim 1, after "of said" insert -- each --.

In Column 14, Line 33, in Claim 1, after "of said" insert -- each --.

In Column 14, Line 39, in Claim 1, after "wherein said" insert -- each --.

In Column 14, Line 53, in Claim 1, after "from said" insert -- each --.

In Column 14, Line 55, in Claim 1, after "said" insert -- each --.

In Column 15, Line 27, in Claim 4, delete "list." and insert -- list; --, therefor.

In Column 16, Line 26, in Claim 11, after "said" insert -- each --.

In Column 16, Line 44, in Claim 11, after "of said" insert -- each --.

In Column 16, Line 51, in Claim 11, after "of said" insert -- each --.

In Column 16, Line 57, in Claim 11, after "said" insert -- each --.

In Column 17, Line 4, in Claim 11, after "said" insert -- each --.

In Column 17, Line 6, in Claim 11, after "said" insert -- each --.

Signed and Sealed this
Second Day of March, 2021

Drew Hirshfeld
*Performing the Functions and Duties of the
Under Secretary of Commerce for Intellectual Property and
Director of the United States Patent and Trademark Office*